United States Patent
Pezzullo et al.

(10) Patent No.: US 10,688,743 B2
(45) Date of Patent: Jun. 23, 2020

(54) METHOD FOR THE TREATMENT OF A SEALANT LAYER OF A TYRE, SEALANT AND TYRE

(71) Applicant: BRIDGESTONE CORPORATION, Tokyo (JP)

(72) Inventors: Giuseppe Pezzullo, Rome (IT); Marco Bruni, Rome (IT); John Nazareno House, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/780,779

(22) PCT Filed: Dec. 2, 2016

(86) PCT No.: PCT/IB2016/057321
§ 371 (c)(1),
(2) Date: Jun. 1, 2018

(87) PCT Pub. No.: WO2017/093971
PCT Pub. Date: Jun. 8, 2017

(65) Prior Publication Data
US 2019/0224933 A1    Jul. 25, 2019

(30) Foreign Application Priority Data

Dec. 2, 2015 (IT) .................. 102015000079373

(51) Int. Cl.
| | |
|---|---|
| B29D 30/06 | (2006.01) |
| B29C 73/22 | (2006.01) |
| B29C 35/08 | (2006.01) |
| B29K 19/00 | (2006.01) |

(52) U.S. Cl.
CPC .......... *B29D 30/0685* (2013.01); *B29C 73/22* (2013.01); *B29C 2035/0827* (2013.01); *B29D 2030/0686* (2013.01); *B29D 2030/0697* (2013.01); *B29K 2011/00* (2013.01); *B29K 2019/00* (2013.01)

(58) Field of Classification Search
CPC ........ B29D 30/0685; B29D 2030/0697; B29D 2030/0686; B29K 2019/00; B29K 2011/00; B29C 73/22; B29C 2035/0827
See application file for complete search history.

(56) References Cited

U.S. PATENT DOCUMENTS

| | | | | |
|---|---|---|---|---|
| 4,548,687 A | * | 10/1985 | Kitamura | .............. B29C 73/163 522/125 |
| 4,874,670 A | * | 10/1989 | Boon | ...................... B32B 25/00 428/423.9 |

FOREIGN PATENT DOCUMENTS

| | | |
|---|---|---|
| EP | 2 168 758 A1 | 3/2010 |
| EP | 2 865 515 A1 | 4/2015 |

OTHER PUBLICATIONS

International Search Report for PCT/IB2016/057321 dated Mar. 8, 2017 [PCT/ISA/210].
Written Opinion for PCT/IB2016/057321 dated Mar. 8, 2017 [PCT/ISA/237].

* cited by examiner

*Primary Examiner* — Robert S Walters, Jr.
(74) *Attorney, Agent, or Firm* — Sughrue Mion, PLLC

(57) ABSTRACT

A method for reducing the stickiness on the surface exposed to the air of a sealant layer applied on an inner cavity of a tyre. The method establishes that the surface exposed to the air of the sealant layer is subject to a UV radiation.

5 Claims, No Drawings

METHOD FOR THE TREATMENT OF A SEALANT LAYER OF A TYRE, SEALANT AND TYRE

CROSS REFERENCE TO RELATED APPLICATIONS

This application is a National Stage of International Application No. PCT/IB/2016/057321, filed on Dec. 2, 2016, which claims priority from Italian Patent Application No. 102015000079373, filed on Dec. 2, 2015.

TECHNICAL FIELD

The present invention concerns a treatment method of a sealant layer of a tyre.

BACKGROUND ART

The use of a viscous sealant layer generally arranged in the inner cavity of the tyre has been known for some time. In particular, the sealant layer is generally arranged in contact with the inner liner layer in the area of the tread strip. The object of the sealant layer is to surround and adhere to the object that has penetrated the tread, thus preventing air from leaking out of the tyre by means of instantaneous "sealing". Furthermore, if the penetrated object exits from the tread, the material of the sealant layer will occupy the hole left by the object, sealing it.

The viscosity of the sealant layer is one of the most important parameters for the effectiveness of said sealant layer. In fact, the viscosity of the sealant layer must be able to guarantee both the sealing action on the penetrated object and on the hole left by the object as described above, and its stability in the inner cavity of the tyre regardless of the static or dynamic conditions of the tyre. As is known to a person skilled in the art, a correct viscosity of the sealant layer necessarily results in a high surface stickiness of said layer. While a certain stickiness of the surface of the sealant layer which in use is in contact with the inner liner layer can be useful, for the opposite surface, i.e. the one exposed to the air, it can constitute a serious problem. In fact, during storage of the tyre, foreign materials such as dust, leaves or even insects stick on the surface of the sealant layer exposed to the air. This necessarily downgrades the commercial value of the tyre with obvious financial consequences for the manufacturers and the dealers.

The need was therefore felt for a sealant layer having the required viscosity characteristics in order to correctly perform its function but which, at the same time, has a low stickiness on the surface exposed to the air such as to avoid the drawbacks described above.

The inventors of the present invention have surprisingly found that the application of a UV radiation on the surface exposed to the air of the sealant layer drastically reduces its stickiness, without modifying the characteristics of the sealant layer overall and, therefore, without compromising its effectiveness.

DISCLOSURE OF INVENTION

The subject of the present invention is a method for the application of a sealant layer in a tyre comprising a deposition step, in which a sealant layer is deposited on a free surface of an inner liner layer facing onto an inner cavity of the tyre; said method being characterized in that it comprises a step of reducing the stickiness, in which a surface exposed to the air of said sealant layer deposited on said inner liner layer is subject to the direct action of a UV radiation.

Preferably, said UV radiation has a wavelength ranging from 200 to 400 nm.

Preferably, said UV radiation has a radiant exitance ranging from 250 $W/m^2$ to 1500 $W/m^2$, more preferably from 500 $W/m^2$ to 1000 $W/m^2$.

Preferably, said surface exposed to the air is subject to a UV radiation for a time ranging from 5 to 15 minutes, more preferably from 8 to 10 minutes.

Another subject of the present invention is a sealant layer applied on an inner surface of a tyre carcass and characterized in that it has a surface exposed to the air which has undergone the action of a UV radiation according to the method subject of the present invention.

Preferably, said sealant layer comprises 20 to 100 phr of a halobutyl rubber, 5 to 60 phr of a filler, 50 to 400 phr of a plasticizer agent and a vulcanization system. More preferably, said sealant layer comprises 40 to 60 phr of a halobutyl rubber, 10 to 30 phr of a filler and 150 to 250 phr of a plasticizer agent.

A further subject of the present invention is a tyre comprising a sealant layer, of which a surface exposed to the air has undergone the action of a UV radiation according to the method subject of the present invention.

BEST MODE FOR CARRYING OUT THE INVENTION

An embodiment example is given below purely by way of illustrative non-limiting example.

A compound was prepared for the production of a sealant layer, the formulation of which is reported in phr in Table I.

TABLE I

| | |
|---|---|
| Halobutyl rubber | 100.0 |
| Carbon black | 40.0 |
| Plasticizer | 240.00 |
| Sulphur | 0.5 |
| Stearic acid | 1.5 |
| Zinc oxide | 1.0 |
| Accelerant | 4.0 |

The halobutyl rubber is a bromobutyl rubber.
The carbon black used is identified by N550.
The plasticizer used is naphthenic oil.
The accelerant used is dibenzothiazyl disulphide (MBTS).

The ingredients indicated in Table I were mixed together and kept under stirring at a temperature of 100° C. for 10 min.

The compound thus prepared was vulcanized and applied on the surface of an inner liner layer. In particular, the sealant layer was heated and placed in an extruder from where it was extruded directly above the inner liner layer.

The sealant layer is applied according to a known technique and therefore does not constitute an innovative aspect for the present invention.

A surface exposed to the air of the sealant layer was irradiated with a UV lamp for 15 minutes. The lamp used emits in a radiant exitance range between 500 $W/m^2$ and 1000 $W/m^2$ and in a wavelength range between 200 and 400 nm.

During treatment with the UV radiation, the stickiness of the surface subject to the treatment was periodically measured, identifying a progressive reduction in the stickiness. It was found that after the 15 minutes of irradiation, the stickiness on the irradiated surface had decreased by approximately 80% compared to the initial stickiness.

To verify whether the treatment subject of the present invention could compromise the effectiveness of the sealant layer overall, the viscosity and stickiness values of the surface exposed to the radiation were measured and also the pressure retention following puncturing of the tyre on which said treatment was applied.

For a significant evaluation of the effects of the treatment subject of the present invention, the above parameters were measured both on the layer that underwent the UV radiations and on a sealing layer that was identical but did not undergo UV radiations. A comparison between the values recorded on the two sealant layers can reveal whether application of the treatment subject of the present invention has effects or not, not only on the surface stickiness, but also on the characteristics important for effectiveness of the sealant layer.

The viscosity measurement was obtained according to the ISO13145 standard procedure while the stickiness measurement was obtained according to the D1876 standard procedure.

The pressure retention test was performed on tyres on which the sealant layer not subject to the UV radiation treatment and the sealant layer subject to 15 minutes of UV radiation were applied, in the same conditions. After inflating the tyres to the same internal pressure, they were subjected to the same puncturing conditions with subsequent removal of the object used for the puncturing. For each of the tyres that underwent the test, retention of the pressure 24 h after puncturing (and subsequent removal of the object) was evaluated.

Table II shows the values of the above tests, in indexed form with respect to the sealant layer not subjected to the UV radiation treatment.

TABLE II

| | Before treatment | After treatment |
|---|---|---|
| Viscosity | 100 | 100 |
| Pressure retention | 100 | 100 |
| Stickiness | 100 | 20 |

From the values of Table II it can be seen that, while the treatment subject of the present invention causes a drastic reduction in surface stickiness, the viscosity and pressure retention characteristics are not modified by the irradiation with the UV radiations.

In other words, the treatment of the present invention solves the problems of the known art, drastically reducing the stickiness of the surface exposed to the air of the sealant layer applied on the inner cavity of a tyre, without compromising in any way the sealing properties thereof.

The invention claimed is:

1. A method for the application of a sealant layer in a tire comprising a deposition step, in which a vulcanized sealant layer having a stickiness is deposited on a free surface of an inner liner layer facing an inner cavity of the tire; and a step of reduction of the stickiness, in which a surface exposed to the air of said sealant layer deposited on said inner liner layer is subject to the direct action of a UV radiation.

2. A method according to claim 1, characterized in that said UV radiation has a wavelength range ranging from 200 to 400 nm.

3. A method according to claim 1, characterized in that said UV radiation has a radiant exitance ranging from 250 W/m$^2$ to 1500 W/m$^2$.

4. A method according to claim 3, characterized in that said UV radiation has a radiant exitance ranging from 500 W/m$^2$ to 1000 W/m$^2$.

5. A method according to claim 1, characterized in that said surface exposed to the air is subject to a UV radiation for an amount of time ranging from 5 min to 15 min.

* * * * *